US010343852B2

(12) United States Patent
Roth

(10) Patent No.: US 10,343,852 B2
(45) Date of Patent: Jul. 9, 2019

(54) DEVICE AND METHOD FOR DELIVERING ORIENTED ELEMENTS

(71) Applicant: GEBO PACKAGING SOLUTIONS FRANCE SAS, Reichstett (FR)

(72) Inventor: Emmanuel Roth, Reichstett (FR)

(73) Assignee: GEBO PACKAGING SOLUTIONS FRANCE SAS, Reichstett (FR)

( * ) Notice: Subject to any disclaimer, the term of this patent is extended or adjusted under 35 U.S.C. 154(b) by 10 days.

(21) Appl. No.: 15/536,805

(22) PCT Filed: Dec. 29, 2015

(86) PCT No.: PCT/FR2015/053764
§ 371 (c)(1),
(2) Date: Jun. 16, 2017

(87) PCT Pub. No.: WO2016/108026
PCT Pub. Date: Jul. 7, 2016

(65) Prior Publication Data
US 2017/0349382 A1    Dec. 7, 2017

(30) Foreign Application Priority Data

Dec. 30, 2014  (WO) ................ PCT/EP2014/079478

(51) Int. Cl.
*B65G 47/14*    (2006.01)
*B65G 47/57*    (2006.01)
*B65G 47/82*    (2006.01)

(52) U.S. Cl.
CPC ......... *B65G 47/57* (2013.01); *B65G 47/1471* (2013.01); *B65G 47/82* (2013.01);
(Continued)

(58) Field of Classification Search
CPC .................................................. B65G 47/844
(Continued)

(56) References Cited

U.S. PATENT DOCUMENTS 2,609,926 A  *  9/1952  Hartig ..................... B07C 5/122
                                                    198/370.08
3,658,167 A      4/1972  Zabroski et al.
(Continued)

FOREIGN PATENT DOCUMENTS

DE           26 32 043 A1    1/1978
DE    10 2008 057 902 A1    5/2010
(Continued)

OTHER PUBLICATIONS

International Search Report, dated Mar. 10, 2016, from corresponding PCT application No. PCT/FR2015/053764.

*Primary Examiner* — Gene O Crawford
*Assistant Examiner* — Lester Ill Rushin
(74) *Attorney, Agent, or Firm* — Young & Thompson

(57) ABSTRACT

Disclosed is a sorting device for elements of the cap or stopper type, used to close a bottle or vial, or of the plastic preform type. The device includes a continuous conveyor arranged to travel in a conveying direction and equipped with successive transverse stop members between which the elements can rest in transverse alignment. The sorting device includes an ejector for ejecting the elements from the conveyor by moving the elements essentially along the length of the transverse stop members, the ejector include at least one push member which can move at least transversely to the conveying direction so as to push the elements towards the exit zone. Also disclosed is a corresponding method.

10 Claims, 4 Drawing Sheets

(52) U.S. Cl.
CPC ............... *B65G 2201/0235* (2013.01); *B65G 2812/02227* (2013.01)

(58) Field of Classification Search
USPC ............... 198/393, 396, 397.01, 397.06, 890
See application file for complete search history.

(56) References Cited

U.S. PATENT DOCUMENTS

| | | | |
|---|---|---|---|
| 4,735,343 A | 4/1988 | Herzog | |
| 5,394,972 A | 3/1995 | Aidlin et al. | |
| 5,586,637 A | 12/1996 | Aidlin et al. | |
| 7,040,489 B2 | 5/2006 | Zemlin et al. | |
| 8,783,439 B2* | 7/2014 | Lopez | B65G 47/1471 |
| | | | 198/397.01 |
| 9,540,184 B2* | 1/2017 | Groot | B65G 47/844 |
| 2014/0309768 A1 | 10/2014 | Groot et al. | |

FOREIGN PATENT DOCUMENTS

| | | |
|---|---|---|
| DE | 10 2012 205 060 A1 | 10/2013 |
| EP | 1 652 801 A1 | 5/2006 |
| FR | 2 683 214 A1 | 5/1993 |
| GB | 2 142 598 A | 1/1985 |
| WO | 2006/045928 A1 | 5/2006 |
| WO | 2009/153489 A1 | 12/2009 |

* cited by examiner

DEVICE AND METHOD FOR DELIVERING ORIENTED ELEMENTS

BACKGROUND OF THE INVENTION

Field of the Invention

This invention relates to the field of the orientation and delivering of elements conveyed continuously, and it has as its object, on the one hand, a method for sorting such elements before delivering them to the machine downstream and, on the other hand, a device using this method.

In the field of the invention, the elements can be preforms to be heated and then blow-molded in a blow mold to create a container of much greater volume. It can also involve capping elements. The delivery of capping elements is necessary upstream from a machine that has the function of filling the container and closing it.

Description of the Related Art

The delivery of a capping element is performed preferably with a device comprising a hopper, into which a large quantity of capping elements can be poured in bulk, an elevating conveyor belt, moving upward from the hopper to pick up elements there and to bring them to an upper discharge zone. The conveyor belt generally has transverse strips on which the capping elements rest while being conveyed upward. Comparable structures are possible to sort and deliver preforms, such as, for example, WO2009153489 as well as EP1652801.

During the movement on the conveyor belt between the hopper, supply zone, and discharge zone, the poorly-oriented capping elements are ejected, preferably simply by causing them to fall from the conveyor belt toward the hopper as a result of gravity, as is described in, for example, U.S. Pat. No. 5,394,972 or 5,586,637.

Generally, when the elements have arrived opposite the discharge zone, they are removed from the conveyor belt as a result of a suitable device.

Thus, U.S. Pat. No. 5,394,972 proposes ejecting capping elements as a result of an air flow coming from a box mounted on the side of the conveyor belt that is opposite the discharge zone. Such a pneumatic ejection is also proposed in, for example, WO2006045928, as well as U.S. Pat. No. 7,040,489. An ejection based on pneumatic flow has drawbacks among which are energy consumption, noise, and possible pollution of the capping elements by dust and the like, which makes this principle unusable in fields where the health and hygiene requirements are high.

U.S. Pat. No. 4,735,343 discloses, in turn, a stationary angled strip, which creates a wedge effect and has the effect of exerting a transverse force that removes the capping elements toward the discharge zone. This principle, however, causes serious jamming problems, in particular given that the speeds are high. Further, the opening of the discharge zone must be very long, which makes jamming likely in this zone here too given that the speeds are high.

BRIEF SUMMARY OF THE INVENTION

It is therefore necessary to propose a solution for sorting and delivering capping elements that solves all or part of the problems above. In this context, the invention proposes releasing the capping elements toward the discharge zone by pushing them mechanically by contact, and this in particular using a pusher that is movable from one side of the conveyor belt to the other in the area of the discharge zone.

The invention also has as its object a sorting device for elements of the cap or lid type to close a jar or bottle, or else of the plastic preform type, comprising a continuous conveying means made to be moved in a conveying direction and equipped with successive transverse stops between which the elements can rest in the form of a transverse alignment and thus be transported by said conveying means from a supply zone of the sorting device, said sorting device further having a discharge zone, in the area of which the elements leave the conveying means after having been brought there by it.

This device is characterized in that it comprises an ejection means, to remove the elements from the conveying means by moving them essentially along the transverse stops and comprising at least one pusher that is able to be moved at least transversely to the direction of conveying to push the elements toward the discharge zone.

The invention also has as its object a sorting method for elements such as caps, lids, or other parts for closing a container, even such as with a collar, like a plastic bottle preform, said method comprising conveying the elements on a conveying means moving in a conveying direction, from a supply zone to a discharge zone located on one side of said conveying means, removing the elements that are present in the area of the discharge zone from the conveying means toward the discharge zone.

This method is a method characterized in that removing the elements from the conveying means takes place by pushing them by contact with a movable pusher.

BRIEF DESCRIPTION OF THE DRAWINGS

The invention will be better understood as a result of the description below, which is based on possible embodiments, explained in a manner that is illustrative and in no way limiting, with reference to the accompanying figures, in which.

DETAILED DESCRIPTION OF THE PREFERRED EMBODIMENTS

Figure 1:
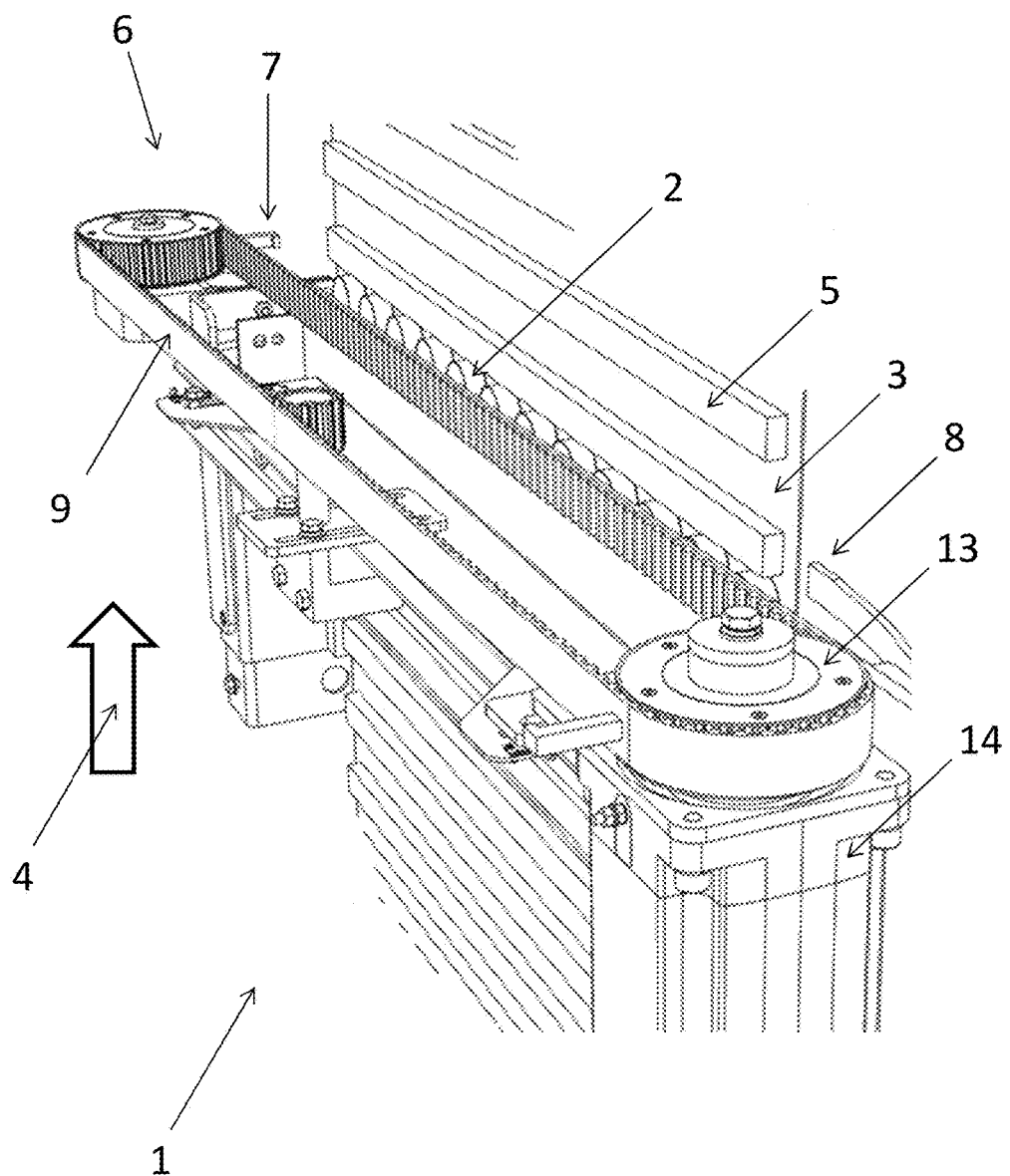
FIG. 1 shows a schematic diagram for an embodiment with an essentially vertical conveyor belt.

The invention thus has, first of all, as its object a sorting device 1 for elements 2 of the cap or lid type for closing a jar or bottle, or else of the plastic preform type, comprising a continuous conveying means 3 made to be moved in a conveying direction 4 and equipped with successive transverse stops 5 between which the elements 2 can rest in the form of a transverse alignment and thus be transported by said conveying means 3 from a supply zone of the sorting device 1, said sorting device 1 further having a discharge zone 8, in the area of which the elements 2 leave the conveying means 3 after having been brought there by it.

The sorting device 1 can therefore handle elements 2 for closing a container, such as a bottle, a jar, or the like, as well as a preform. A typical capping element 2 is a cap or lid, including at least one part, and conforming in a complementary way to the throat of a container, and is therefore cylindrical. A preform, for its part, is a hollow plastic part with a throat that is intended to be heated and then stretched under the effect of a gas that is injected under pressure while the preform is in a larger cavity.

The sorting device 1 thus has a conveying means 3 that moves the elements 2 continuously in a conveying direction 4. This conveying means 3 can move the elements 2 along a plane, the conveying direction 4 then being at all times parallel to it. The conveying means 3 can also move the elements 2 along a curved profile. The conveying means 3 can convey the elements 2 upward, for example. It can take the form of a conveyor belt 3 or of successive transverse stops. In preferred embodiments, the conveying direction 4 goes in the direction of a vertical elevation, see FIG. 1.

Figure 2:
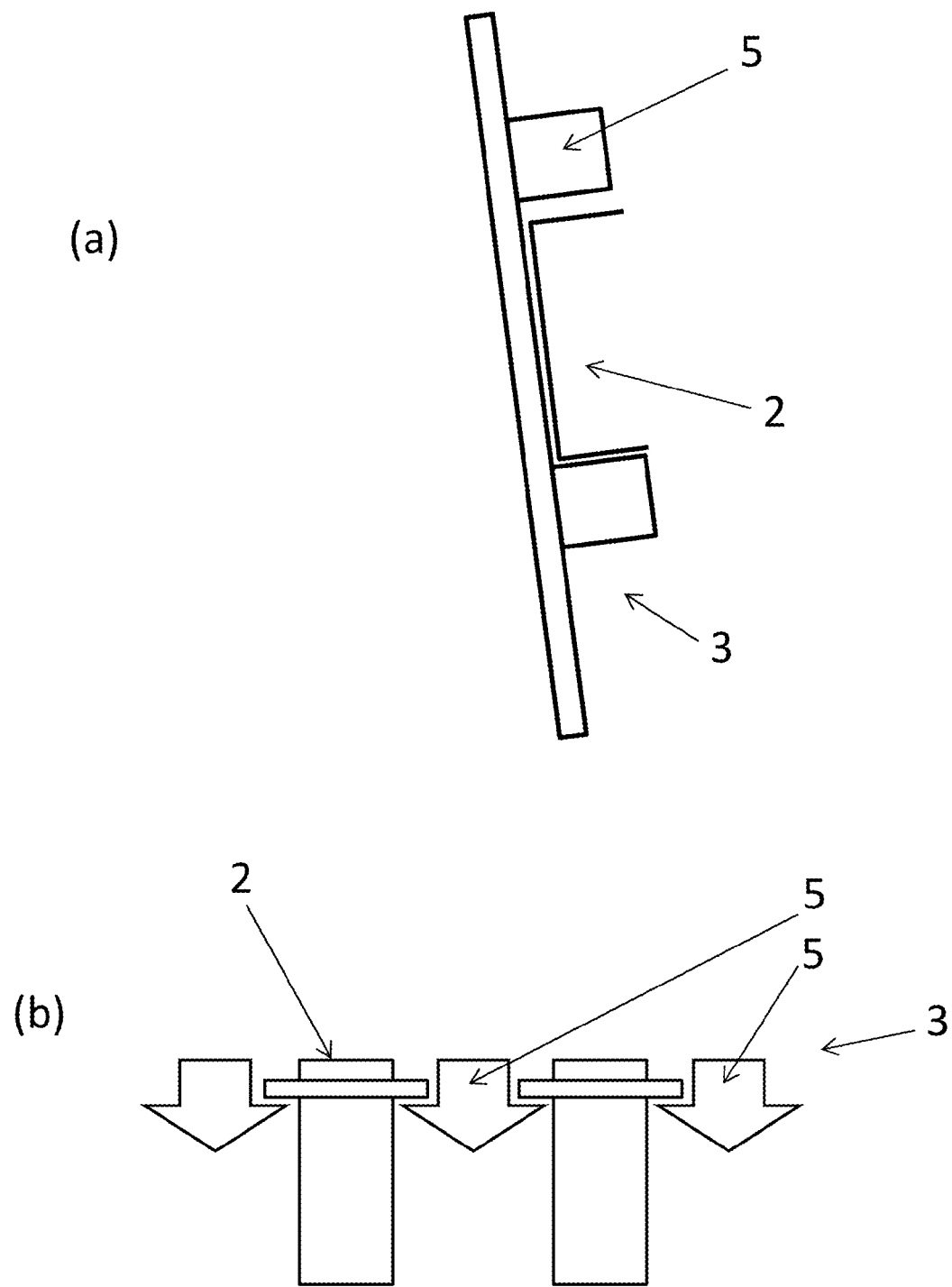
FIG. 2 shows a cross-section between two transverse stops, in two different embodiments, 2*a* and 2*b*.

To entrain the elements 2, it has stops 5 that are transverse to the conveying direction 4, which extends transversely from one side to the other of the conveying means 3. The elements 2 therefore rest against these stops, considering the orientation in relation to gravity. FIG. 2a shows, for example, a conveying means in the form of a conveyor belt on which the stops 5 are placed. An element 2 is shown pressing against a stop 5, and placed against the bottom surface of the conveyor belt. Generally, gravity then acts so as to flatten the element 2 against the stop. FIG. 2b illustrates another possibility, where the elements 2 can cross the conveying means 3. The diagrammed elements 2 are preforms, provided with collars, which press against the stops 5, under the action of the gravity that here acts also toward the bottom of the figure.

The transverse stops 5 therefore in particular take the form of strips 5 having a certain thickness and placed on a conveyor belt, as well as strips that make it possible, two by two, to support an element 2 in the form of a preform in the area of its collar.

The conveying means 3, for its part, is in the form of an endless driving element, such as an endless belt, band, or the like. It can be successive transverse strips, held by their ends.

The conveying means 3 moves the elements 2 from a supply zone to a discharge zone 8, where the elements 2 must be ejected by a transverse movement relative to the conveying means 3 so as to bring them all to the same side of said conveying means 3. During operation, the transverse stops therefore advance one after the other in the area of the discharge zone 8, and the elements 2 that rest on them are pushed toward the discharge zone 8, row after row. The supply zone is found particularly in the area of a supply hopper that can accommodate a batch of elements 2 to be processed in the case of elements 2 in the form of lids or caps. Generally, the conveying means 3 moves from a place where the elements 2 are placed in bulk, and brings them with it as a result of the transverse stops 5.

According to the invention, the sorting device 1 comprises an ejection means 6, to remove the elements 2 from the conveying means 3 by moving them essentially along the transverse stops 5 and comprising at least one pusher 7 that can be moved at least transversely to the conveying direction 4 to push the elements 2 toward the discharge zone 8.

The ejection means 6 comprises, for example, at least one jack or other actuator, such as a driven belt. It therefore has the function of pushing all of the elements 2 that are located between two successive transverse stops in the direction of the side of the conveying means 3 where the discharge zone 8 is found, and this from the opposite side. Its maneuver is therefore repeated at each passing of a transverse stop, as a matter of emptying it, and as it is full of elements 2 from one side to the other, even if there is only a single element 2 very near the discharge zone 8. The pusher 7 therefore has an active movement, during which it pushes from one side to the other the elements 2, then a movement of return to the initial position. Preferably, if there is only one pusher 7, the back and forth being fast enough to be done between two passages of successive transverse stops. This is, of course, adjusted to the number of pushers 7 used.

The ejection means 6 therefore enters into contact, in the area of the pusher 7, with the element 2 that is farthest away from the discharge zone 8 and pushes it toward it, while thus entraining the elements 2 that are between them one after the other. The orientation of the conveying means 3 at this location relative to gravity and/or the spacing between two successive transverse stops can in particular serve to prevent jamming. As will be developed more below, the pusher 7 can have a movement relative to the stops that is uniquely parallel to them. It is then necessary to develop also for the pusher 7 a movement in the conveying direction 4 relative to a common frame of reference.

Thus, according to a possible additional characteristic, the at least one pusher 7 is able to be moved also in the conveying direction 4 and in similar fashion. The relative movement between the conveying means 3 and the pusher 7 can then be uniquely transverse. The conveying means 3 and the pusher 7 then both have, relative to a fixed point of the sorting device 1, a movement in the conveying direction 4 and in similar fashion. This movement of the pusher 7 can be achieved by construction, as a function of the actuator selected.

To avoid any interaction with the transverse stops 5, it is advantageous to provide that the pusher 7 have a slight movement relative to the conveying means 3 in a longitudinal direction, i.e., in the conveying direction 4. Generally, the at least one pusher 7 is made to follow the movement that a transverse stop 5 undergoes in the conveying direction 4 while said pusher 7 is moved transversely to said direction. It is then possible, for example, that the pusher 7 occupies the entire space between two stops 5 or in any case that it does not interfere with the elements 2 of the following row.

In particular embodiments, the ejection means 6 comprises a belt 9 of the endless band type, on which is mounted overhanging at least one pin forming a pusher 7 and whose end acts on the elements 2, said belt 9 moving in particular around driving wheels 13 that are movable in rotation around an axis that is essentially perpendicular or parallel to the conveying means 3. Said belt 9 has in particular a direction of movement with a component that is transverse to the conveying direction 4 of the conveying means 3, even comprising further a component parallel to said direction.

FIG. 1 illustrates, for example, the particular case where the ejection means 6 comprises two pushers 7 in the form of a projecting outer pin from the surface of the band of the belt 9.

According to a possible additional characteristic of the sorting device 1, it further comprises a frontal stop means 11, of the holding plate type, extending at a distance from the conveying means 3 to hold the elements 2 against the latter, the at least one pusher 7 extending on both sides of this frontal stop means 11, so as to be driven into the zone located on one side of said frontal stop means 11 and so as to act on the elements 2 in the opposite zone. This is shown in particular in FIGS. 3a and 3b.

Figure 3:
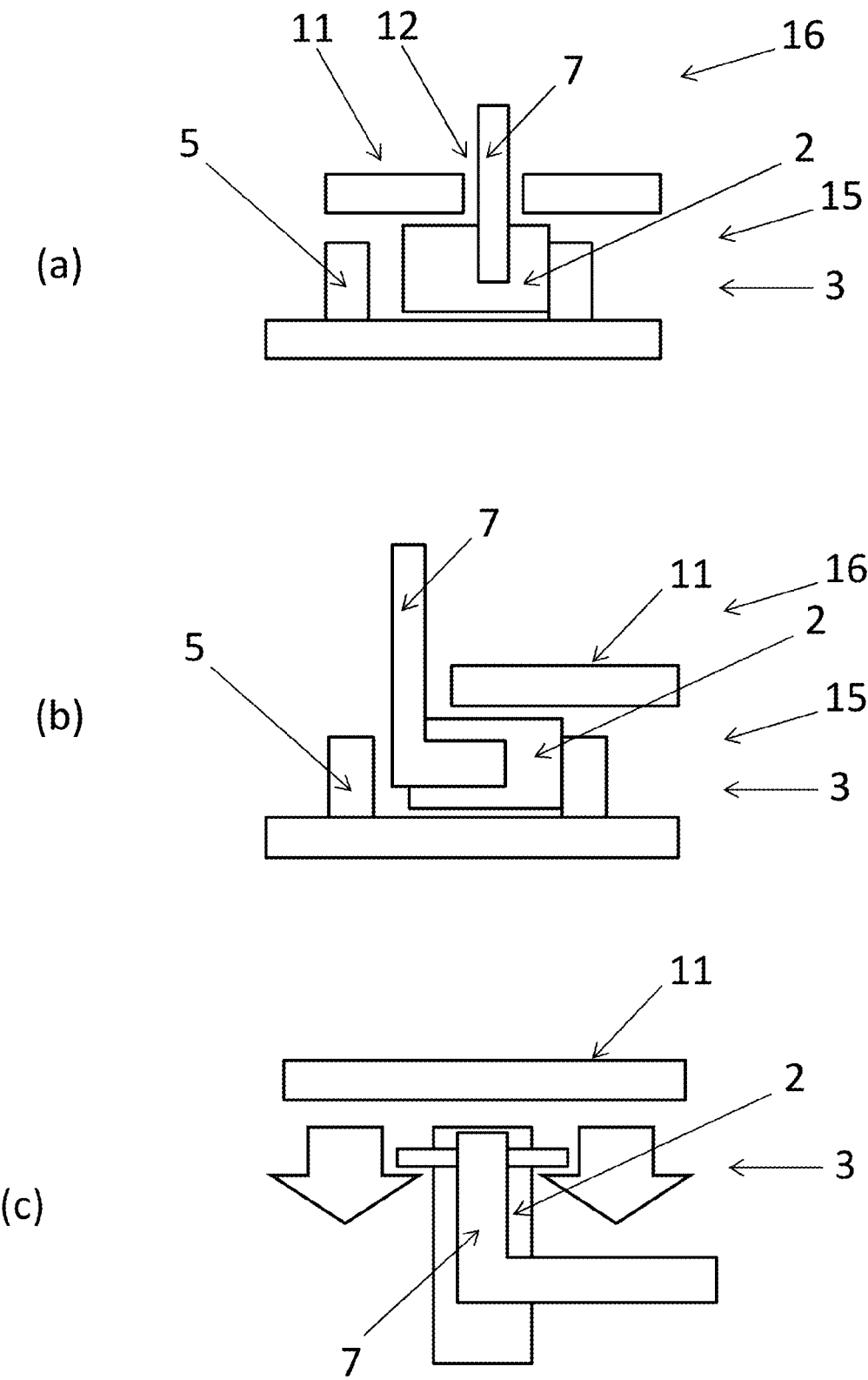
FIG. 3 illustrates the possible interaction with a front stop means.
Figure 4:
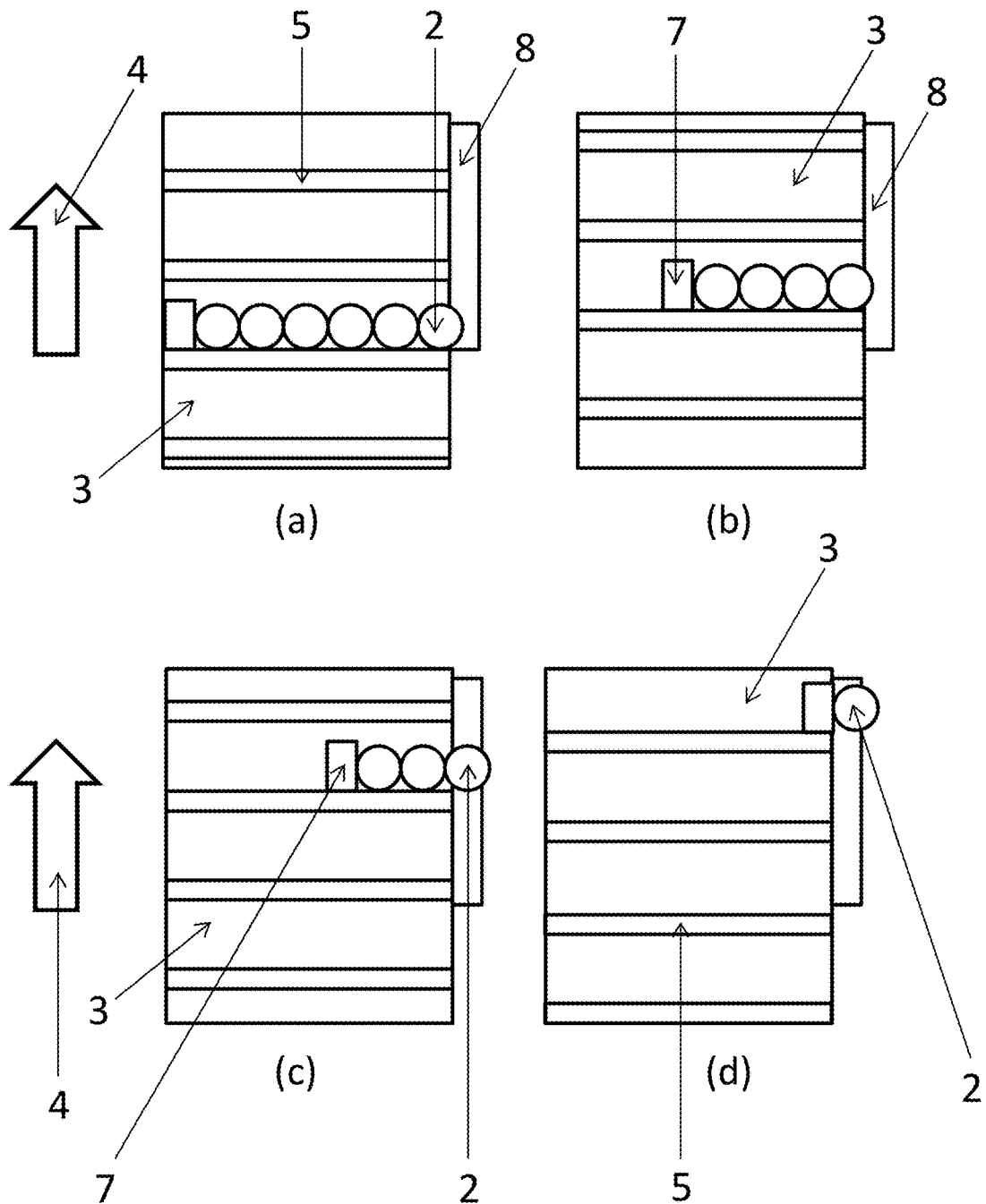
FIG. 4 shows the change in position of an element column under the action of the ejection means.

The end of the frontal stop means 11 extends particularly with an angled end part to follow the movement of the elements 2 in the conveying direction 4 while they are sent into the discharge zone 8, the at least one pusher 7 taking the form of a hook extending above said end, see FIG. 3b.

Alternatively, the frontal stop means 11 has an essentially linear angled opening 12 to follow the movement of the elements 2 in the conveying direction 4 while they are sent into the discharge zone 8, the at least one pusher 7 crossing the frontal stop means 11 in the area of said opening 12, FIG. 3a.

In these two cases, the active part of the pusher 7 is therefore found on one side of the frontal stop means 11, whereas its base, connected to the actuator that puts it in motion, such as the jack, belt 9 or the like, is found on the other side of the frontal stop means 11.

FIG. 3c shows a particular alternative where the pusher 7 is completely on the same side of the frontal stop means 11.

The invention also has as its object a sorting method for elements 2 such as a cap, a lid, or other parts for closing a container, even such as with a collar, like a plastic bottle preform, said method comprising conveying the elements 2 on a conveying means 3 moving in a conveying direction 4, from a supply zone to a discharge zone 8 located on one side of said conveying means 3, removing from the conveying means 3, toward the discharge zone 8, the elements 2 that are present on the conveying means 3 at this moment, i.e., the elements 2 that arrive in the area of the discharge zone 8, as a result of a transverse movement. The conveying from the supply zone to the discharge zone 8 is actually generally accompanied at the same time by the elimination of the elements 2 that do not conform to a positioning criterion, or makes possible only the conveying of the elements 2 that are correctly positioned.

This method uses the sorting device 1 as described above.

During the above-mentioned conveying step, this method can also eliminate from the conveying means 3 the elements 2 that are not placed there with a predefined orientation, or can force their positioning. Generally, in the area of the discharge zone 8, the elements 2 must be in a predefined position.

Removing the elements 2 in the area of the discharge zone 8 is done by a movement of the elements 2 that is transverse to the conveying direction 4, and this movement is caused by an ejection means 6, which comprises at least one pusher 7, moved by an actuator.

Thus, according to the invention, removing the elements 2 from the conveying means 3 is done by pushing them by contact with a movable pusher 7, which is therefore moved from one side to the other of the conveying means 3, toward the discharge zone 8. The at least one pusher 7 therefore acts on the element 2 located opposite the discharge zone 8 so as to push it toward it, this element 2 acting on the following one in the direction of said discharge zone 8 and so on.

Said movable pusher 7 can therefore be moved toward the side of the discharge zone 8, from the opposite side, transversely to the conveying direction 4.

According to a possible additional characteristic, the pusher 7 is movable both transversely to the conveying direction 4, i.e., from one side to the other of the conveying means 3, and in said conveying direction 4, so as to be able, during its action against the elements 2, to push them transversely toward the discharge zone 8, to accompany the movement of said elements 2 in the conveying direction 4 and in similar fashion, the relative movement being possibly zero in the conveying direction 4.

Thus, according to a possible additional characteristic, the speed of movement of the pusher 7 in the conveying direction 4 is such that said pusher 7 follows the movement of the conveying means 3 in said direction.

In a preferred way, the speed of movement of the pusher 7 transversely to the conveying direction 4 is fast enough to ensure that both an element 2 that would be located at the end of the conveying means 3 near the discharge zone 8 and an element 2 that would be located at the other end can pass into an opening of the discharge zone 8, taking into account the movement of the conveying means 3 in the conveying direction 4. It is thus preferable to provide a high transverse speed so that the opening can be small. Actually, an opening that is too large can cause jamming problems when it involves reduction to a movement of a single column. Said speed is further possibly fast enough so that the at least one pusher 7 does not hamper the progress of the conveyor belt 3 in the conveying direction 4.

Finally, according to a possible additional characteristic concerning the control of the sorting device 1, the travel speed of the pusher 7 is proportional to the travel speed of the conveying means 3. As will also be described below, the speed of the pusher 7 is uniform during its travel, but preferably is proportional to the speed of advance of the conveying means 3.

The invention will now be explained with reference to the illustrated embodiments. FIG. 1 thus illustrates a sorting device 1 having a hopper, not shown, into which elements 2 such as caps or lids for closing a bottle can be deposited in bulk.

A conveyor belt 3 forming a conveying means extends from an opening made in the area of the lower part of the hopper, forming a supply zone. The conveyor belt 3 takes the form of an endless band, which rises from the supply zone to a height that depends quite often on the height at which it is necessary to deliver the elements 2 to the machine downstream.

The conveyor belt 3 therefore advances in a conveying direction 4 that corresponds to the long length of said conveyor belt 3 and entrains the elements 2 upward, to a discharge zone 8. The conveying direction 4 therefore has a vertical component, and can also have a horizontal component making it possible for gravity to press the elements 2 against the conveyor belt 3.

The conveyor belt 3 comprises successive strips 5, forming transverse stops, which extend transversely to the conveying direction 4 and therefore along the width of the conveyor belt 3. During the elevation in the conveying direction 4, the elements 2 rest on the strips 5 that entrain them in the conveying direction 4. They are evenly distributed along the conveyor belt 3 with a certain spacing and have a certain height that makes it possible for them to form a support for the elements 2. They further extend preferably from one side of the conveyor belt 3 to the other. Thus, each strip 5 entrains a plurality of elements 2 as a function of the quantity present in the supply zone. A strip 5 can at most entrain one row of elements 2 that occupies its entire width. Since the elements 2 that are not correctly positioned on the conveyor belt 3 are removed from it between the supply zone and the discharge zone 8, it is possible that there are many fewer elements 2 to be removed, even none, when the strip 5 arrives in the area of the discharge zone 8. It is therefore necessary to be able to eject from a strip 5 both an element 2 that would be found at the end of the strip 5 near the discharge zone 8 and an element 2 that would be found at the other end. The speed of the movement of the ejection means 6 is therefore adjusted to ensure these ejections, taking into account the advance of the conveyor belt 3 and the dimensions of the passage of the discharge zone 8.

To remove the elements 2 from the conveyor belt 3 in the area of the discharge zone 8, the sorting device 1 comprises an ejection means 6 that pushes, by contact, the elements 2 that are against a strip 5 and this up to said discharge zone 8. FIG. 1 shows, for example, a column of elements 2 against a strip 5, which must be pushed by the ejection means 6 toward the discharge zone 8. The ejection means 6 thus acts on the element 2 that is farthest away from the discharge zone 8 and is moved toward it, each of the elements 2 of the column acting against the one in front of it in the direction of the discharge zone 8.

As FIG. 1 illustrates, the ejection means 6 comprises an endless band or belt 9, which turns as a result of two wheels 13 that are in rotation around an essentially vertical axis. At least one of the two wheels 13 is driving and drives the belt 9, optionally as a result of a toothed interaction. The sorting device 1 thus comprises a motor 14 that drives at least one of the wheels 13. The two wheels 13 are each placed beyond the conveyor belt 3, so that the belt 9 has a flat linear movement near the conveyor belt 3 over the entire width of the latter.

With such a configuration, the belt 9 therefore follows a path such that it runs along the conveyor belt 3 in one direction, for an action on the elements 2, and then, after the return around a wheel 13, travels in the reverse direction, at a distance from the conveyor belt 3, for its return path to starting position. The useful travel, during which the ejection means 6 acts on the elements 2, to push them toward the side of the conveyor belt 3 where the discharge zone 8 is found from the opposite side of the conveyor belt 3, takes place therefore against the conveyor belt 3, while the return to the starting point takes place in a plane that is more distant from the conveyor belt 3, which makes it possible in particular to avoid any mechanical interaction between the ejection means 6 and the conveyor belt 3 on this return path. Of course, other assemblies are possible to set up the return: the axes of wheels 13 can be, for example, essentially horizontal, the back and forth then forming approximately a plane parallel to the conveyor belt 3, etc.

It will be noted that generally, the ejection means 6 can use different actuator types to create the movement of the at least one pusher 7 in the direction of the discharge of the elements 2.

The ejection means 6 comprises at least one pusher 7 to act by contact on the column of elements 2 to be removed toward the discharge zone 8. In the embodiment illustrated in FIG. 1, the ejection means 6 comprises a belt 9 on which at least one pin 10 extends overhanging, which comes into contact with the element 2 that is found farthest away from the discharge zone 8. FIG. 1 in this case shows two pins 10 each forming a pusher 7.

The pusher 7 thus extends overhanging from the belt 9 part near the conveyor belt 3, until it is against the elements 2. To ensure a good entrainment, it is useful that the pusher 7 act against the largest part possible of the element 2. It is therefore preferable that the pusher 7 act not only against the part of the element 2 that extends beyond the strip 5, but also against the part of the element 2 that corresponds to the height of the strip 5 from the bottom of the conveyor belt 3. This then means that the pusher 7, in its active path from one end of the strip 5 to the end in the area of the discharge zone 8, must also travel in the hollow space between two successive strips 5. Since the strips 5 are mounted on a movable conveyor belt 3 during the action of the pusher 7, it is necessary to coordinate the transverse movement of the pusher 7 from one side to the other of the conveyor belt 3 with the movement of advance of said conveyor belt 3, to prevent too slow a transverse movement of the pusher 7 from creating a collision between it and the strip 5 that has moved longitudinally closer to it.

In the particular cases where the strips 5 are widely spaced, it can be permissible to have a pusher 7 that is moved only in a direction that is strictly transverse to the conveying direction 4 and sufficiently fast to avoid the collisions described above. The speed of the pusher 7 is a function of the pace if it is slow.

Generally, it is preferable to create a movement of the pusher 7 that comprises not only a main component that is transverse to the conveying direction 4 to push the elements 2 in the direction of one side of the conveyor belt 3, but also a longitudinal component, in the conveying direction 4, with the same direction. Preferably, the ejection means 6 is configured so that the longitudinal movement of the pusher 7 during its travel from one side to the other of the conveyor belt 3 during the ejection corresponds to the longitudinal movement that the strip 5 undergoes simultaneously.

This longitudinal movement of the pusher 7 is obtained by design in the case of an ejection means 6 based on a belt 9 principle as illustrated in FIG. 1. It is then sufficient to offset, in relation to one another in the conveying direction 4, the wheels 13 around which the belt 9 turns so that the wheel 13 on the side of the discharge zone 8 is farther forward than the other in terms of the conveying direction 4.

It should be noted that the range of movement that the conveyor belt 3 undergoes during the ejection of the elements 2 toward the discharge zone 8 defines the longitudinal dimension of the opening of the discharge zone 8. Actually, this opening must be adequate to allow all of the elements 2 to pass in the extreme case where they are of such a number that they occupy the entire width of the conveyor belt 3. The element 2 that is initially the closest to the discharge zone 8 is therefore ejected from the very beginning of the action of the ejection means 6, whereas the one that was initially farthest away is ejected at the end of the maneuver of the ejection means 6, and after having traveled a certain longitudinal distance. A large opening can, however, result in jamming, since it is necessary to obtain ultimately a flow of elements 2 that is organized into a single column.

Thus, to avoid having to create too large an opening, it is preferable to provide an ejection means 6 capable of removing all of the elements 2 in the shortest time possible, and therefore preferably with minimal movement in the longitudinal direction.

The travel speed of the pusher 7 is proportional, with a fixed factor, to the travel speed of the conveying means 3. The size of the longitudinal window through which the elements 2 are removed to one side is itself also fixed, as well as the angle between the direction of the movement of the pusher 7 and the conveying direction 4.

The sorting device 1 further comprises a frontal stop means 11, which is used to hold the elements 2 against the conveyor belt 3. Actually, vibrations could have the effect of offsetting the elements 2, the latter then being farther from the bottom of the conveyor belt 3, i.e., perpendicular to it. In the cases where the conveyor belt 3 is oriented so that gravity does not press the elements 2 against the conveyor belt 3, this frontal stop means 11 makes it possible to ensure that the elements 2 are not farther from the conveyor belt 3, and thus remain effectively well held by the strips 5. The frontal stop means 11 can then take essentially the form of a plate, parallel to the conveyor belt 3, at a distance from the bottom of the conveyor belt 3 that is, of course, greater than the height of the strips 5, and at least slightly greater than the height of the elements 2. This frontal stop means 11 is no longer necessary beyond the discharge zone 8, since the elements 2 have usually been removed from the conveying means 3. The frontal stop means 11 therefore delimits a first zone, or work zone 15, where the elements 2 are moving, and a second zone, or exterior zone 16, on the other side, where the belt 9 or other actuator is moving.

The at least one pusher 7 of the ejection means 6 is actuated from the exterior zone 16, where the actuator of the ejection means 6, belt 9, jack, or the like is found. Since the at least one pusher 7 must act against the elements 2, and since the former travel into the work zone 15, the at least one pusher 7 must extend on both sides of the frontal stop means 11 or at least from its projection, i.e., it has a portion in the work zone 15, to act against the elements 2, as well as a portion in the exterior zone 16, to be driven by the actuator of the ejection means 6. To make possible the passage of the at least one pusher 7 from one side to the other of the boundary defined by the frontal stop means 11, it has a passage, or opening 12, in which the at least one pusher 7 can travel during its action against the elements 2 for the purpose of removing them by the discharge zone 8.

For example, the frontal stop means 11 in the form of a plate parallel to the conveying means in the form of a conveyor belt 3 can comprise an opening 12 that follows the trajectory of the at least one pusher 7, in particular a linear opening 12, extending from one side to the other of the conveyor belt 3 and possibly also in the conveying direction 4 and in similar fashion. The frontal stop means 11 can then take the form of two successive elements, separated by said opening 12, which ensures a holding of the elements 2 even during their transverse movement. The pusher 7 can then be straight, extending essentially perpendicular to the plane of the conveyor belt 3 at this location. The element 2 thus remains guided by the frontal stop means 11 on each side of the opening 12, the pusher 7 acting approximately in the middle of the element 2, as FIG. 3a shows, which represents the cross-section along the path from one side to the other of the conveyor belt 3. This figure illustrates that at any location between the two sides of the conveyor belt 3, the element 2 is held by the frontal stop means 11 on each side of the pusher 7.

As FIG. 3b shows, it is also possible simply to provide a frontal stop means 11 whose contour of the free end follows the trajectory that the pusher 7 has on the elements 2 during its active travel. This path of the pusher 7 is preferably coordinated with that of the elements 2 when they are, on the one hand, taken in the conveying direction 4 by the conveying means and, on the other hand, taken transversely to this direction toward the discharge zone 8 by the at least one pusher 7. This trajectory preferably takes the form of a straight line, having a component transverse to the conveying direction 4, as well as a component in the conveying direction 4 and in similar fashion, so that said straight line advances in the conveying direction 4 as it advances toward the discharge zone 8. The elements 2 therefore follow this trajectory, as well as the pusher 7 and the end of the frontal stop means 11. The transverse movement of the pusher 7 is then coordinated with the movement of the conveying means 3 so that a sufficient part of the element 2 is continuously covered by the frontal stop means 11, at any point of the routing toward the side of the discharge zone 8.

This FIG. 3b also shows that in this case, the pusher 7 preferably has an elbow shape, with a part extending from the exterior zone 16 up to the work zone 15 beyond the end of the frontal stop means 11. The return of this elbow makes it possible for the pusher 7 to reach the element 2, while the latter is sufficiently between the conveyor belt 3 and the frontal stop means 11 to ensure the desired guiding. The return extends between the frontal stop means 11 and the conveyor belt 3, between two successive strips 5.

With these embodiments, it is possible to push the last element 2 of the transverse column, with an actuator of the ejection means 6 that is located in the exterior zone 16, and a pusher 7 moving from the other side, into the work zone 15, while the element 2 remains, during its entire travel from one side to the other of the conveyor belt 3 contained between, on one side, the surface of the conveyor belt 3, and, on the other side, the frontal stop means 11.

Of course, the pusher 7 can be equipped at its end with a plate for its contact with the element 2, which makes it possible to have a movement of the pusher 7 in the conveying direction 4 that is not strictly the same as that of the element 2 itself all while maintaining a well-balanced transverse force and limiting jamming between the transverse stops.

Thus, the ejection means 6 removes a row of products 2 from the conveying means 3 once the preceding row has been removed, each row, or else batch or string, corresponding to the group of products 2 that are against the same stop means 5. At a given moment, only one pusher 7 is therefore active to eject products 2, and the contents of a single transverse stop 5 are processed by the ejection means 6. The discharge zone 8, located optionally in the upper part of the conveying means 3, is therefore sized to receive a column of a single product 2 in width. Downstream from the discharge zone 8, the flow is organized in successive strings of products 2, behind one another. The products 2 of this discharge flow therefore cross the discharge zone 8 one after the other, essentially transversely to the conveying direction 4 and continue to move farther away from the conveying means 3.

The discharge zone 8, located on one side of the conveying means 3, therefore makes it possible for each product 2 successively to go toward the next step in the process, correctly oriented, so that only the products 2 compatible with the rest of the process travel by the lateral discharge zone 8 one after the other, by a successive string obtained by pushing transversely all of the products 2 aligned in a row beside one another against a transverse stop 5.

The size of the opening of the discharge zone 8 makes it possible to receive both a product 2 that was very close to the side where it is found as well as a product 2 that is very far away, and therefore in the area of the opposite side, the two products 2 being against the same transverse stop 5. The opening of the discharge zone 8 corresponds to the size of one or even two products 2. The discharge zone 8 then slightly narrows up to a channel sized for the movement of a column the width of a single product 2. This slight narrowing from the opening makes it possible to align along the same axis all of the products 2 initially against the same transverse stop 5, it being recalled that, in absolute terms, the last product 2 of the row goes through the opening while being slightly offset relative to the first product 2 in the conveying direction 4, this offsetting corresponding to the path that the conveying means 3 travels. This zone of slight narrowing therefore is not used to reduce into a single column a wide flow of several front products 2, but to address this offsetting and thus to reduce the width of a row of products 2 already behind one another.

The ejection means 6, on the one hand, and the conveying means 3, on the other hand, are furthermore put into motion by separate motors, whose speeds are controlled in a coordinated way. Thus, engaging a pusher 7 on the conveying means 3 is avoided, and the synchronization takes place electronically, which avoids premature wear and breakage, taking into account friction and force transmission.

The discharge zone 8 therefore has an opening or passage, in the form of an opening in a wall-type guiding boundary, which extends from one side of the conveying means 3 in the conveying direction 4. The discharge zone 8 then extends in a channel in which the products 2 move in the form of a discharge flow consisting of a column that is a single product 2 wide. This single column flow is formed by the succession of batches of products 2, each batch corresponding to the group of products 2 that would be found previously against the same stop means 5.

The products 2 have a circular base, which, at the speeds at which this type of sorting device 1 operates, can lead to jamming problems in the cases where it is necessary to narrow to a single column a flow of products 2 that is initially wider going through the opening of the discharge zone 8, even a flow with two front products 2 or more. The opening of the discharge zone 8 is therefore sized for the travel of a column flow that is a single product 2 wide, and optionally also to take into account the advance of the conveying means 3 between the first product 2 ejected and the last, as explained above.

Ejecting the products 2 through the opening of the discharge zone 8 in the form of successive strings or batches that is a single product 2 wide makes it possible to avoid the creation in the discharge zone 8 of a convergence guiding for bringing a flow that is significantly wider than a single product 2 toward a single column flow, and the associated jamming problems. Preferably, the opening of the discharge zone 8 therefore does not exceed the size of two products 2, so as to avoid any superposition of products 2 or offsetting transversely to their advance, leading to a wide flow. In addition, in order to eject only the contents of a single stop means 5 at a time, the spacing between the successive stop means 5 is on the order of magnitude of the opening of the discharge zone 8, for example approximately two products 2. The spacing between the successive stop means 5 is preferable slightly larger than the opening of the discharge zone 8, therefore slightly larger than one or two products 2.

The transverse movement of a pusher 7 from one side to the other of the conveying means 3 therefore takes place with a longitudinal movement in the conveying direction 4 on the order of the size of the opening. Taking into account the size of the opening, in particular between one and two products 2, to avoid the jamming problems mentioned above, the movement of the ejection means 6 is therefore almost perpendicular to the conveying direction 4.

As a result of the invention, it is thus possible to eject elements from a sorting device equipped with a continuous conveyor, and this in a reliable and fast way, all while limiting the energy consumed and while meeting high hygiene conditions.

Although the description above is based on particular embodiments, it is in no way limiting of the scope of the invention, and modifications can be made, particularly by substitution of technical equivalents or by a different combination of any or part of the characteristics developed above.

The invention claimed is:

1. A sorting device for elements of a cap or lid configured to close a jar or bottle, or a plastic preform, the sorting device comprising:
   a continuous conveying system configured to be moved in a conveying direction and equipped with successive transverse stops between which the elements are able to rest in the form of a transverse alignment and be transported by said conveying system from a supply zone of the sorting device;
   a discharge zone, in an area in which the elements leave the conveying system after having been brought to the discharge zone by the conveying system, the discharge zone being sized to receive a column of a single element; and
   an ejection system configured to remove the elements from the conveying system by moving the elements essentially along the transverse stops, the ejection system comprising
      at least one pusher configured to be moved at least transversely to the direction of conveying to push the elements toward the discharge zone, and
      an endless band belt, on which is mounted overhanging at least one pin forming the pusher and having an end that acts on the elements,
   wherein only elements that conform to a specific positioning criterion are conveyed from the supply zone to the discharge zone.

2. The sorting device according to claim 1, wherein the at least one pusher is configured to be moved in the conveying direction and in a conveying sense.

3. The sorting device according to claim 2, wherein the at least one pusher is configured to follow the movement that one of the transverse stops undergoes in the conveying direction while said pusher is moved transversely to said conveying direction.

4. The sorting device according to claim 1, further comprising:
   a frontal holding plate stop device, extending at a distance from the conveying system to hold the elements against the conveying system, the at least one pusher extending on both sides of the frontal holding plate stop device to be driven into an area located on one side of said frontal holding plate stop device to act on the elements in an opposite area.

5. The sorting device according to claim 1, wherein the discharge zone comprises a plurality of walls defining an opening through which the elements are ejected.

6. The sorting device according to claim 2, further comprising:
   a frontal holding plate stop device, extending at a distance from the conveying system to hold the elements against the conveying system, the at least one pusher extending on both sides of the frontal holding plate stop device to be driven into an area located on one side of said frontal holding plate stop device to act on the elements in an opposite area.

7. The sorting device according to claim 3, further comprising:
   a frontal holding plate stop device, extending at a distance from the conveying system to hold the elements against the conveying system, the at least one pusher extending on both sides of the frontal holding plate stop device to be driven into an area located on one side of said frontal holding plate stop device to act on the elements in an opposite area.

8. A sorting method for elements including caps, lids, and other parts configured to close a container, and elements with a collar, including a plastic bottle preform, said method comprising:
   conveying the elements on a conveying system moving in a conveying direction, from a supply zone to a discharge zone located on one side of said conveying system;

removing from the conveying system, toward the discharge zone, the elements that are presently on the conveying system; and removing the elements from the conveying system by pushing the elements by contact with a movable pusher, wherein the speed of one movement of the pusher transversely to the conveying direction is fast enough to ensure that the one movement of the pusher causes one element located at the end of the conveying system near the discharge zone and one element located at the other end to pass through an opening of the discharge zone, taking into account the movement of the conveying system in the conveying direction, and the pusher is movable both transversely to the conveying direction, from one side to the other side of the conveying system, and in said conveying direction.

9. The sorting method according to claim 8, wherein the travel speed of the pusher in the conveying direction is such that said pusher follows the movement of the conveying device in said direction.

10. The sorting method according to claim 8, wherein the travel speed of the pusher is proportional to the travel speed of the conveying system.

* * * * *